O. H. ORENDORFF.
LATCH DEVICE.
APPLICATION FILED NOV. 9, 1920.

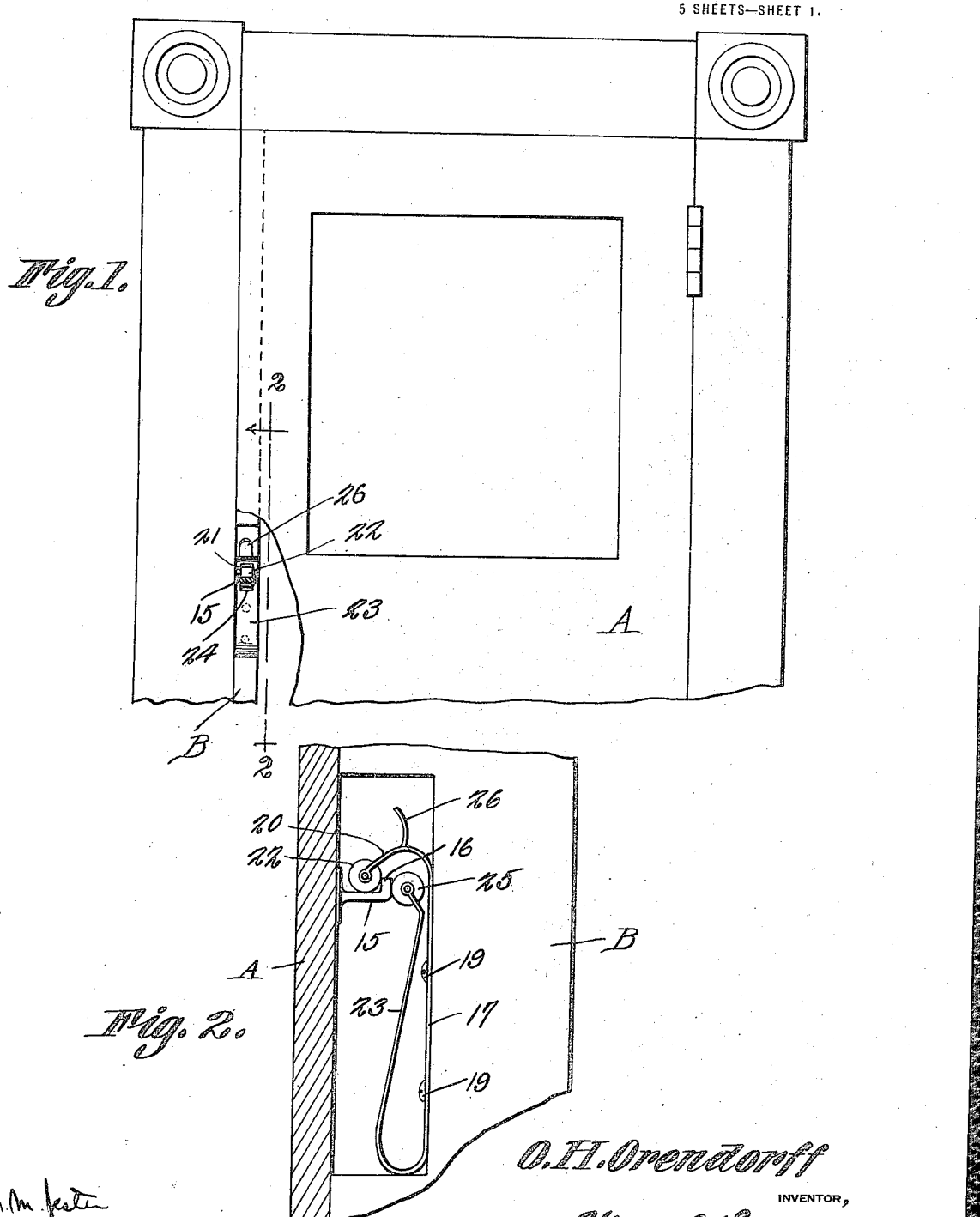

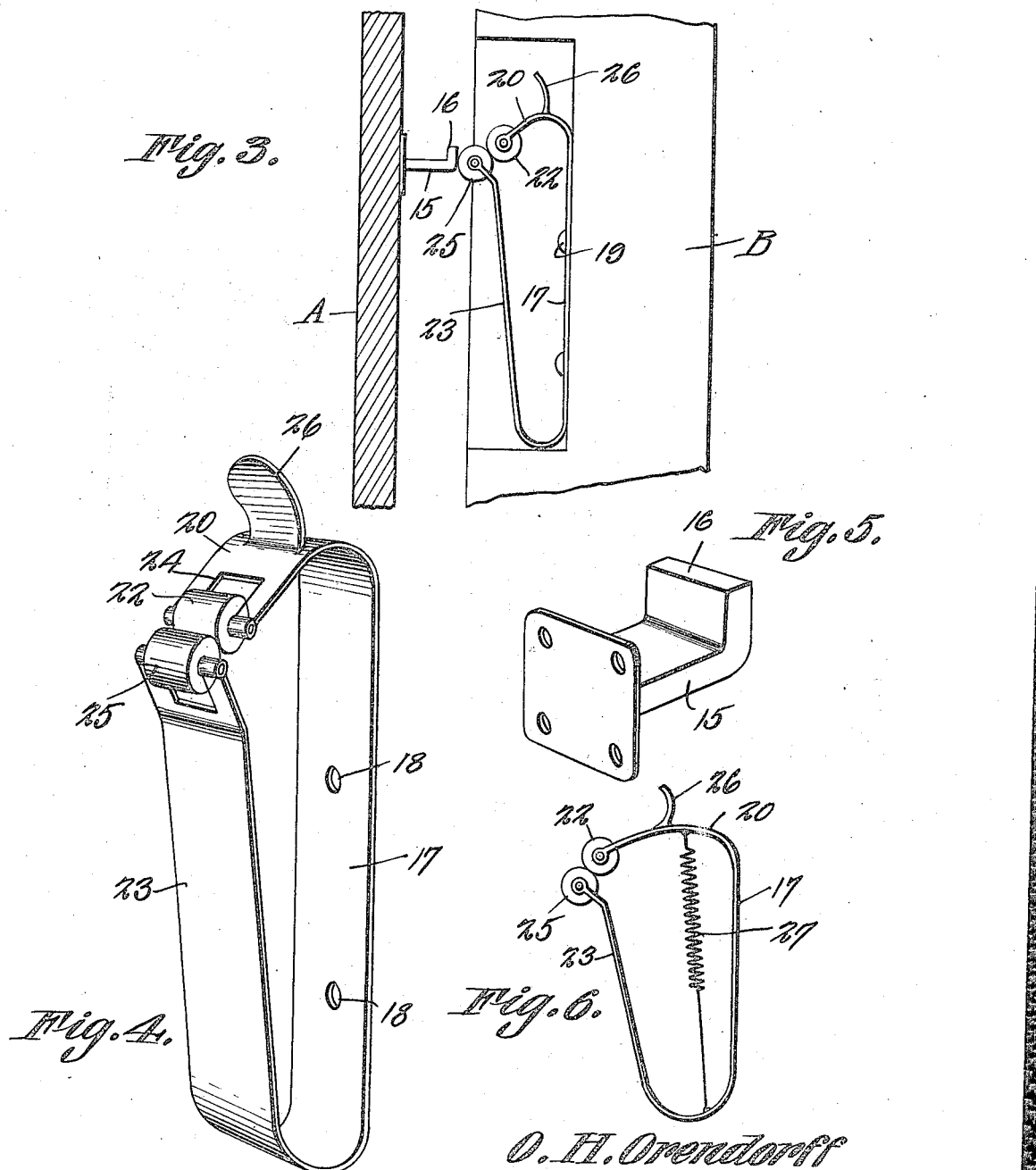

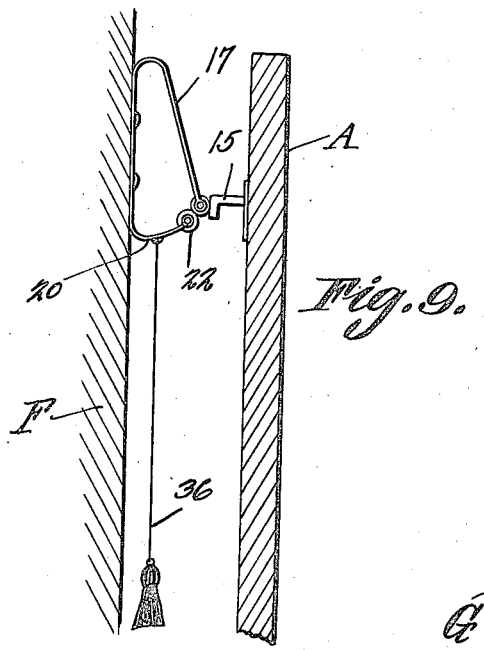
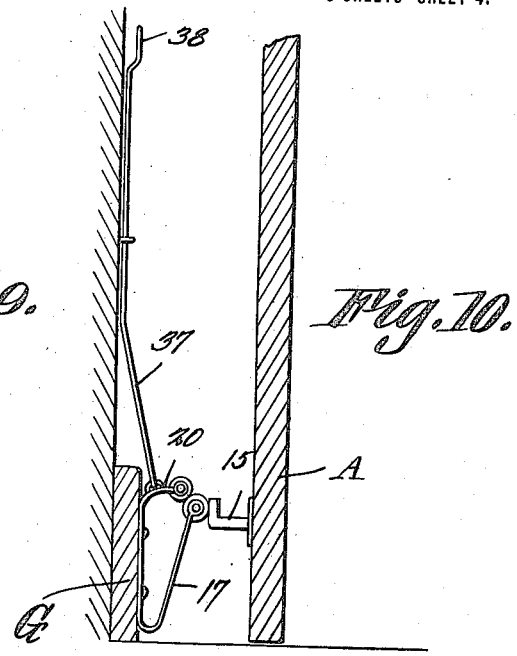
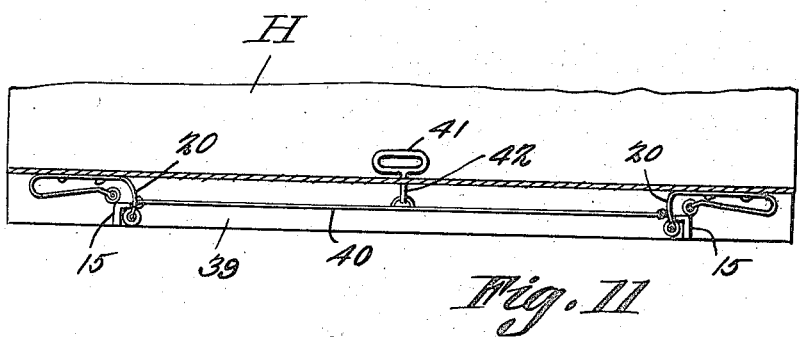
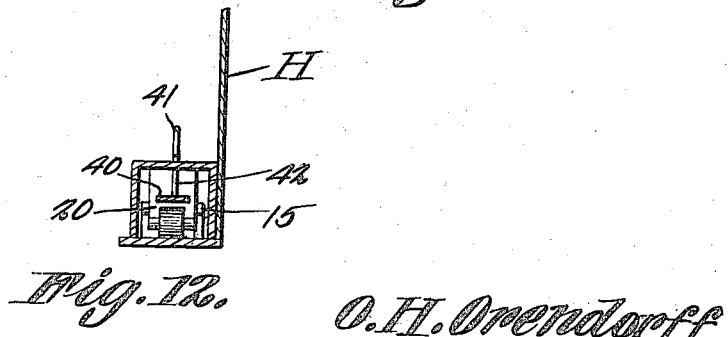

1,424,673.

Patented Aug. 1, 1922.
5 SHEETS—SHEET 5.

O. H. Orendorff
INVENTOR

UNITED STATES PATENT OFFICE.

OLIVER H. ORENDORFF, OF BLOOMINGTON, ILLINOIS.

LATCH DEVICE.

1,424,673.  Specification of Letters Patent.  Patented Aug. 1, 1922.

Application filed November 9, 1920. Serial No. 422,904.

*To all whom it may concern:*

Be it known that I, OLIVER H. ORENDORFF, a citizen of the United States, residing at Bloomington, in the county of McLean and State of Illinois, have invented new and useful Improvements in Latch Devices, of which the following is a specification.

This invention relates to latching devices and has for its object the provision of a novel latching device adapted for use for a wide variety of purposes but designed particularly for use in holding a door of any kind either closed or in any other position, though the device is detachable for use in holding relatively movable members together whether they be hingedly or slidably mounted.

An important object is the provision of a device of this character which is of spring construction whereby it will act as a buffer when a door or the like is engaged therewith and whereby it will also operate to give the door or the like initial movement when the latch mechanism is released.

Another object is the provision of a device of this character which is primarily formed of spring metal and which embodies no sliding parts such as are commonly provided in ordinary latch mechanisms.

An additional object is the provision of a device of this character which will be simple and inexpensive in manufacture, easy to apply and use, efficient in operation, durable in service, and a general improvement in the art.

With the above and other objects and advantages in view, the invention consists in the details of construction to be hereinafter more fully described and claimed and illustrated in the accompanying drawings in which—

Figure 7:
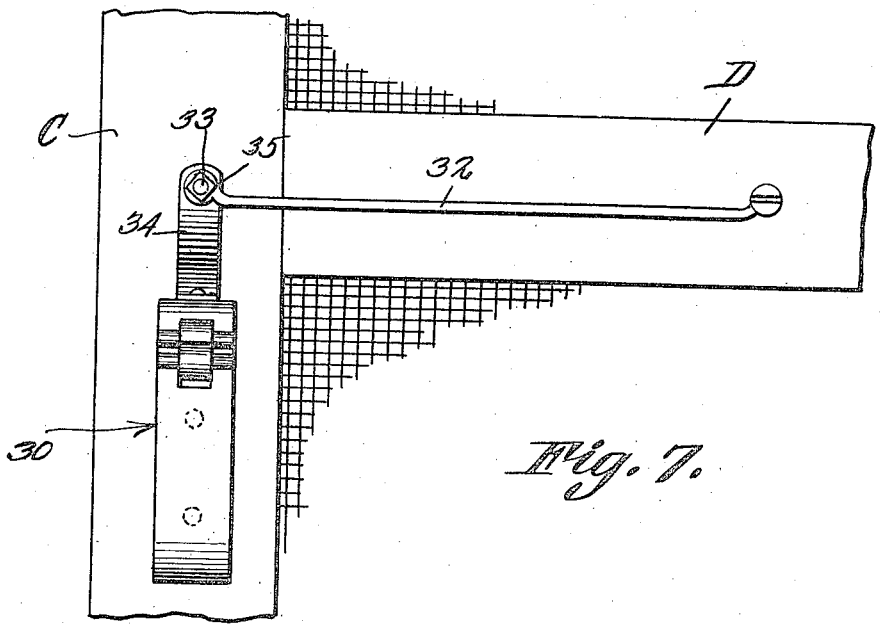
Figure 8:
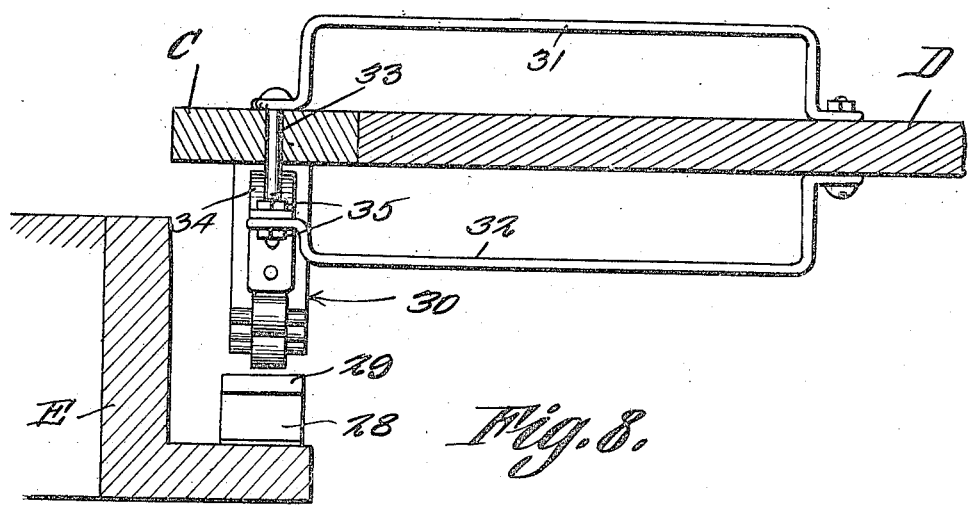
Figure 13:
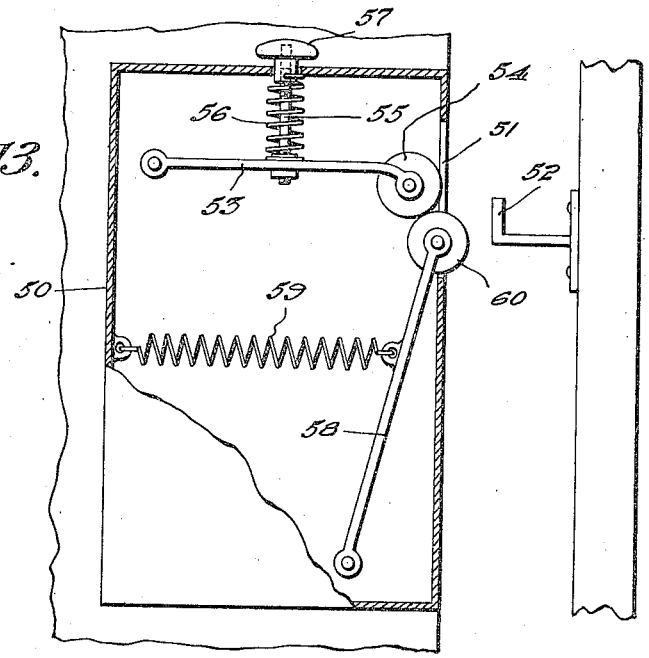
Figure 14:
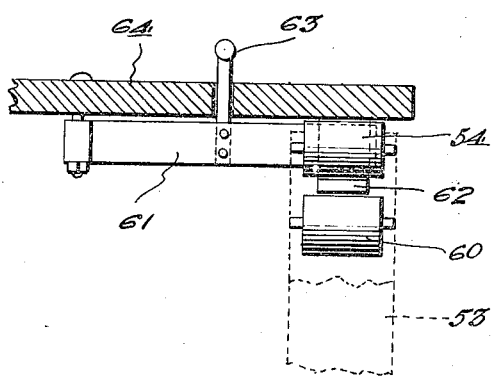
Figure 15:
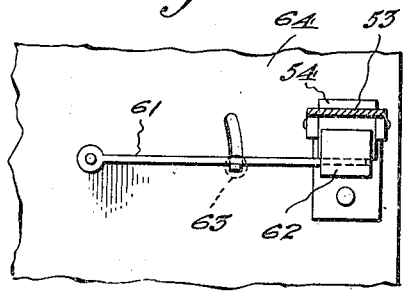

Figure 1 is a face view of a portion of a door and its jamb, showing my device applied thereto, Figure 2 is a vertical sectional view through the door and jamb, showing my device in side elevation with the door in closed position, Figure 3 is a similar view with the door in open position, Figure 4 is a perspective view of the spring device detached, Figure 5 is a perspective view of the latch member detached, Figure 6 is a side elevation of the device showing an auxiliary spring associated therewith, Figure 7 is a face view of my device constructed and arranged specially for use on screen doors, Figure 8 is a cross sectional view through the intermediate cross bar of the screen door, showing the releasing means for my device, Figure 9 is a side elevation of my device used for holding a door in open position and showing it mounted upon the wall, Figure 10 is a similar view showing my device arranged upon the base-board, Figure 11 is a longitudinal sectional view through the lower edge of an automobile hood and showing my device constructed and arranged for holding the hood closed, Figure 12 is a cross sectional view therethrough, Figure 13 is a view of another modification, parts being in elevation and others being in section, and Figures 14 and 15 are views of still another modification.

Referring more particularly to the drawings and especially to Figures 1 to 5, the letter A designates a portion of a door and B designates its jamb. When the word "door" is used it does not necessarily mean a door to a room as it might be a door of a house, barn, garage, or even the door of a piece of furniture such as a cupboard, cabinet, or the like.

Secured either upon the door or upon the jamb is a plunger member 15 of L-shape, as clearly shown in Figure 5, and this plunger member operates as a latch, its upturned end 16 serving this purpose.

Secured either upon the jamb or the door is the spring holding portion of my device which is shown in detail in Figure 4. If the latch is on the door this spring device is on the jamb and vice versa. This spring member is formed of resilient material and might easily be formed of spring wire though it is preferably constructed from a strip of thin spring steel or the like and this strip is bent into substantially triangular shape to provide a portion 17 having holes or the like 18 for the passage of securing screws 19 or nails whereby the device may be attached to the door or jamb, as the case may be. The strip is also bent to provide a horizontally extending arm 20 which is bifurcated to define ears 21 between which is journaled a roller 22. The strip also includes a relatively long inclined tongue 23 which is also bifurcated at its free end, as shown at 24, for journally receiving a roller 25. The tongue 23 is so arranged and so held by the natural resilience of the strip that the roller 25 carried thereby will engage against the roller 22.

Secured upon the arm 20 is an upwardly extending thumb piece 26 adapted to be pressed whereby to swing the arm 20 and consequently the roller 22 away from the roller 25. The plunger 15 and the spring member are so positioned upon the door and jamb that when the door is closed the plunger or catch 15 will engage against the roller 25.

The parts being constructed and arranged as above described, it will be seen that when the door is closed the engagement of the catch 15 with the roller 25 will force the tongue 23 toward the attaching plate 17. At the same time the engagement of the rollers 25 and 22 will cause the arm 20 to be swung upwardly whereupon the roller 25 and upturned end 16 of the catch or plunger 16 will ride under the roller 22 whereupon the arm 20 will spring to its normal position with the roller 22 engaging behind the upturned end 16 of the plunger. The door will then be held in closed position. Owing to the fact that the device is constructed of spring strip it is obvious that the closing of the door will be cushioned so that a slam will be prevented. When it is desired to open the door the operator presses upon the thumb piece 26 which will result in swinging the arm 20 upwardly, withdrawing the roller 22 from behind the end 16 of the catch whereupon the resilience of the tongue 23 will cause it to spring away from the attaching plate 17, forcing the door open to a slight extent.

In case it should be desired to increase the stiffness of the spring action I may provide a coil spring 27 which has one end secured to the lower angle of the spring device and its upper end secured to the arm 20, as indicated clearly in Figure 6.

In Figures 7 and 8 I have shown my device as designed primarily for use upon screen doors. In these figures the letter C designates one upright bar of a screen door and D designates the intermediate cross bar thereof. E designates the jamb. Secured upon the jamb is a plunger 28 identical with the plunger 15 and having an upturned end 29. My spring device is identical with that previously described and designated by the numeral 30, and is secured upon the bar C. The operation of latching the door is exactly the same as that described above. In this form, however, I make use of a different releasing means which comprises a pair of bars 31 and 32 mounted upon opposite sides of the bar D and pivoted at their ends remote from the edge of the door. The free end of the bar 32 is connected with a sliding bolt 33 which passes through the edge of the door and which is connected with a substantially L-shaped member 34 secured upon the horizontal arm of the spring device. The free end of the bar 32 is engaged upon this bolt 33 and the parts are secured by suitable nuts 35 or the like.

In the operation of releasing the catch when used in this capacity involves pulling upon the bar 31 or pushing upon the bar 32 whereupon the L-shaped member 34 will spring the horizontal arm of the spring device so as to disengage from the catch member 28. This operation is substantially the same as the operation effected by pressing upon the thumb piece 26 of the first described form.

In Figure 9 I have shown my device as adapted for holding a door in open position. In this form the spring device is secured upon the wall F at the proper location to be engaged by the plunger carried by the free edge of the door. The operation is the same as when the device is used for holding a door shut but instead of the thumb piece 26 for effecting a release, I provide a cord and tassel 36 connected with the horizontal arm of the spring device for effecting disengagement thereof from the plunger.

In Figure 10 I have shown the device as mounted upon a base-board G for the purpose of holding the door open. The arrangement, construction, and operation of this form are the same as of the preceding forms except that instead of the thumb piece or tassel I make use of an upwardly extending rod 37 connected with the horizontal arm of the spring device and having a finger engaging button 38 whereby it may be pulled upwardly to swing the horizontal arm 20 into unlatching position.

In Figures 11 and 12 I have shown my device as designed for use in holding an automobile hood closed. In this form the hood H is provided at its lower edges with inverted channel bars 39 within each of which is mounted a pair of my spring devices, the arms 20 of which are connected by a flexible strip 40. Associated with the channel bar and movable with respect thereto, is a handle 41 which has a shank 42 slidable through the channel bar and connected with the strip 40. Secured upon the frame bars beneath the edges of the hood is a pair of my plunger members 15 which are adapted to cooperate with and engage within the spring members in exactly the same manner as when the device is used in connection with a door. The difference between this construction and the previously described forms is that in this instance it is only the releasing means which is different, the strip 40 operating to move both of the arms 20 of the spring devices to release the hood when the handle 41 is pulled upwardly.

Referring to Figure 13, it will be seen that I have provided a still further form of the device. In this case I provide a casing 50 secured upon a door jamb and having one edge formed with an opening 51. Associated with the door is an angular catch member 52 identical with the type shown in the preceding figures. Pivoted in the upper part of the casing is a bar 53 carrying a roller 54 at its free end. Connected with this bar is a threaded rod 55 surrounded by a spring 56 and extending through the top of the casing. A nut member 57 is threaded onto the rod for the purpose of varying the tension of the spring. Located at one edge within the casing is a lever bar 58 held under tension by a spring 59 and having its free end carrying a roller 60 cooperating with the roller 54. The operation of this form is the same as of the other forms except that release of the catch is effected by pulling up on the rod 55.

In Figures 14 and 15 I have shown a horizontally pivoted bar 61 having its free end lying flat in the bottom of the catch 62. This bar carries an arm 63 projecting through the door 64 and serving as a handle for lifting the bar to effect release.

From the foregoing description and a study of the drawings it will be apparent that I have thus provided a simply constructed and consequently inexpensive latching device which will not only effectively hold a door or other movable member either in open or closed position but which will cushion the shock when such element reaches an end of its movement and which will also operate to give the initial opening movement when the release is effected.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A device of the character described comprising a catch member having an angular end, and a holding member including an attaching portion, an outwardly extending arm portion, a tongue portion angularly disposed with respect to said attaching portion and said arm portion, said arm and tongue being resilient, and rollers journaled on the free ends of the arm and tongue in overlapping relation, one roller being initially engageable by said catch member and the other roller being adapted for subsequent engagement behind the angular end of the catch member.

2. A device of the character described comprising a catch member having an angular end, and a holding member including an attaching portion, an outwardly extending arm portion, a tongue portion angularly disposed with respect to said attaching portion and said arm portion, said arm and tongue being resilient, and rollers journaled on the free ends of the arm and tongue in overlapping relation, one roller being initially engageable by said catch member and the other roller being adapted for subsequent engagement behind the angular end of the catch member, and means connected with said arm portion whereby to move the same out of engagement with the catch member.

3. A device of the character described comprising a catch member having an angular end, and a holding member including an attaching portion, an outwardly extending arm portion, a tongue portion angularly disposed with respect to said attaching portion and said arm portion, said arm and tongue being resilient, rollers journaled on the free ends of the arm and tongue in overlapping relation, one roller being initially engageable by said catch member and the other roller being adapted for subsequent engagement behind the angular end of the catch member, and means connected with said arm portion whereby to move the same out of engagement with the catch member comprising an L-shaped member secured to said arm portion, and means for moving said L-shaped member.

4. A latching device comprising a catch member, a spring-pressed opening member and a spring-pressed retaining member engageable behind the catch member for holding the opening member under tension.

5. A latching device comprising a catch member, a spring-pressed opening member and a spring-pressed retaining member engageable behind the catch member for holding the opening member under tension, and means for releasing the retaining member to permit operation of the opening member.

6. A latching device comprising a catch member, a spring-pressed arm constituting an opening member, and a retaining member engageable by the catch member for holding the opening member under tension, both of said members having their extremities arranged in overlapping relation.

7. A latching device comprising a catch member, a spring arm constituting an opening member, a retaining member engageable with the catch member for holding the opening member under tension, and rollers journaled on the extremities of said arms and arranged in overlapping relation for engagement by the catch member.

In testimony whereof I affix my signature.

OLIVER H. ORENDORFF.